UNITED STATES PATENT OFFICE.

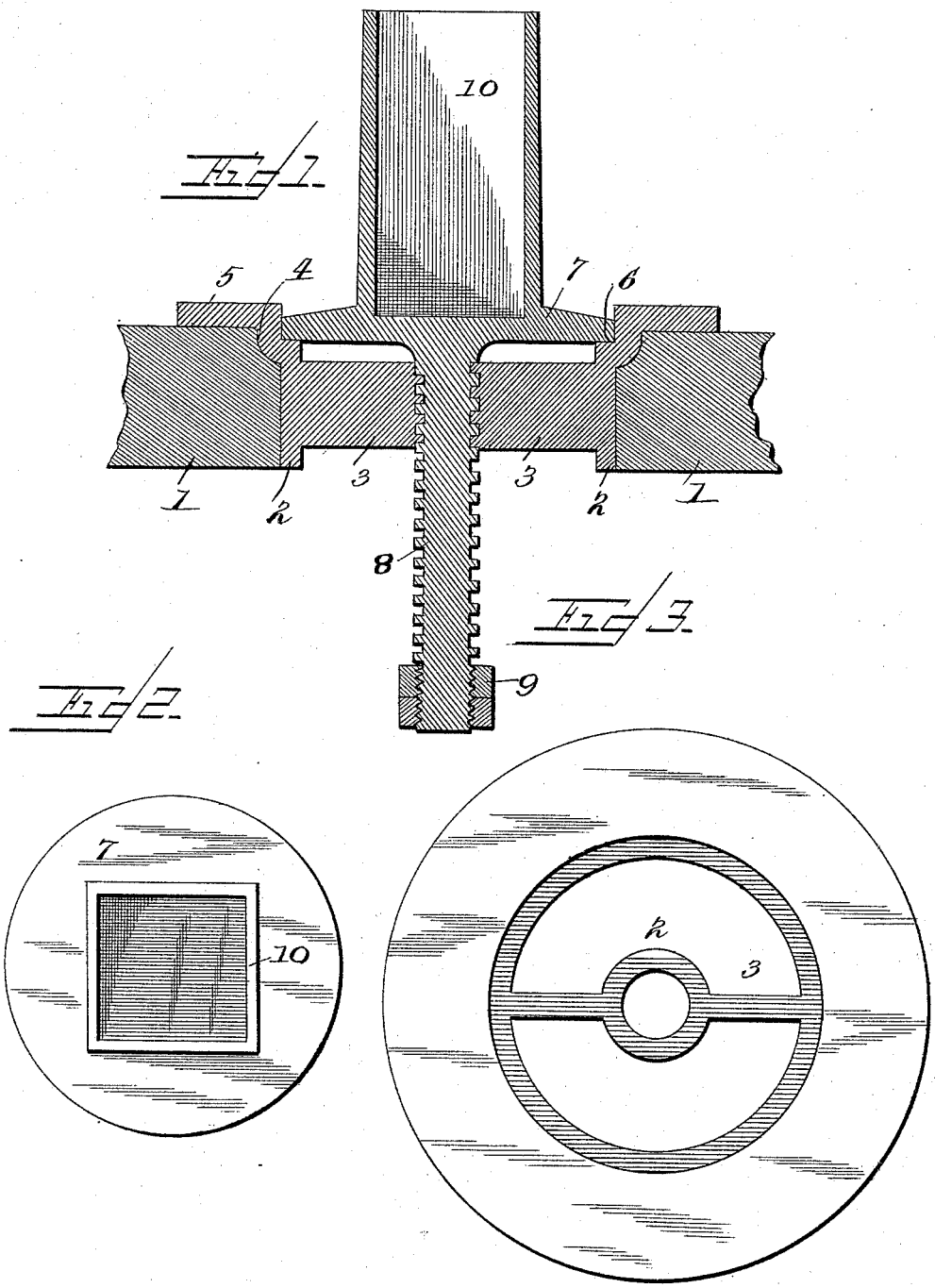

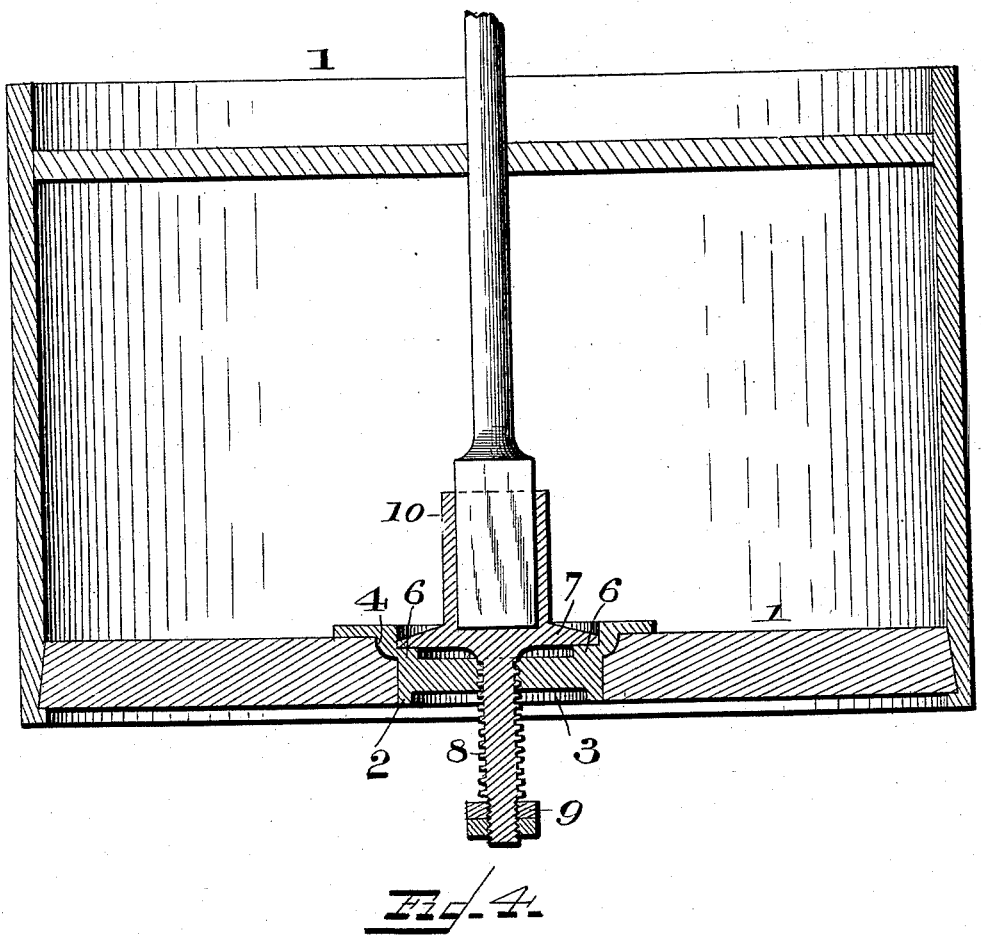

SAMUEL SCOTT JOHNSON, OF OWENSBOROUGH, KENTUCKY, ASSIGNOR OF ONE-HALF TO JOHN S. WRIGHT, OF SAME PLACE.

VALVE FOR FERMENTING-TUBS.

SPECIFICATION forming part of Letters Patent No. 489,868, dated January 10, 1893.

Application filed June 17, 1892. Serial No. 437,096. (No model.)

*To all whom it may concern:*

Be it known that I, SAMUEL SCOTT JOHNSON, a citizen of the United States, and a resident of Owensborough, in the county of Daviess and State of Kentucky, have invented certain new and useful Improvements in Valves for Fermenting-Tubs; and I do hereby declare that the following is a full, clear, and exact description of the invention, which will enable others skilled in the art to which it appertains to make and use the same, reference being had to the accompanying drawings, which form a part of this specification.

My invention relates more especially to valves for the fermenting or mash tubs employed in the manufacture of whisky and beer, although it may be employed with advantage with other vessels or receptacles of a similar character.

In the manufacture of whisky great difficulty is often experienced in preventing the valve located in the bottom of the fermenting tub from leaking, owing to grains of corn, pieces of cob or lumps of meal and other substances, invariably present in the mash or wort which becomes lodged between the valve and its seat, thus preventing a close and accurate fit thereof.

My invention is designed to obviate the above objection and it consists in the novel construction and combination of parts hereinafter described and claimed.

In the accompanying drawings, Figure 1 is a sectional view of a portion of a fermenting or mash tub constructed in accordance with my invention. Fig. 2 is a plan view of the valve; Fig. 3 is a similar view of the bushing containing the valve seat. Fig. 4 is longitudinal sectional view of a mash tub with my improvements applied thereto.

In the said drawings the reference numeral 1 designates the tub or vat, having an annular recess in its bottom, in which is located a circular bushing consisting of the annular boss 2, having a cross piece 3, with a central screw threaded aperture, through which passes a similarly threaded valve stem, hereinafter described. Its upper end is formed with a rounded annular shoulder 4 and an annular flange 5. The bushing, the cross-piece, the shoulder and the flange are all made integral or of one piece of suitable material, and the flange 5, rests upon the bottom of the vat or tub. The upper inner edge of the bushing is formed or provided with an annular groove 6, which constitutes the valve seat.

The numeral 7 denotes the valve consisting of a disk or annular plate, of any suitable metal, which is turned to accurately fit within the valve seat 6. This disk is formed with a downwardly depending screw-threaded stem 8, which passes through the opening in the cross-piece 3, and has its lower end reduced in diameter and provided with screw threads of a different pitch from those just mentioned to receive a nut or tap 9, which limits the upward movement of the valve by striking against the cross-piece 3. The disk is also provided or formed with a square or angular socket 10, to receive the lower end of a wooden or other bar by which it may be rotated. This pole is journaled at its upper end in a bar or board extending across and secured to the tub or vat.

The stem 8 acts as a guide for the valve. The valve and its seat are to be turned so as to make a close and accurate fit and the meeting edges thereof must be sharp enough to sever any grain or lumps when they come together.

The operation will be readily understood. To raise the valve it is rotated by means of the wooden bar which will cause it to be raised from its seat and the contents of the vat or tub escape through the boss. To close the valve a reverse movement is given to the said bar when the valve will descend and any lumps or grain or other substance which would tend to clog the same will be severed by the sharp outer edge of the valve disk and the sharp upper edge of the valve seat, so that said substance will not be lodged therebetween. It will be noted that it is not necessary to lower the valve until its bottom edge rests upon the seat as a sufficiently close joint is established between the side edges to prevent leakage.

Having thus described my invention, what I claim is:

In a fermenting tub or other vessel the combination with the bushing located in an opening in the bottom thereof, provided with a cross-piece having a screw threaded aperture, an annular flange and shoulder and an annular groove in its inner edge forming a valve seat, of the rotatable valve consisting of the annular disk, having a downwardly depending screw-threaded stem with a nut or tap, and an upwardly extending angular socket to receive a bar by which it is rotated, substantially as and for the purpose set forth.

In testimony that I claim the foregoing as my own I have hereunto affixed my signature in presence of two witnesses.

SAMUEL SCOTT JOHNSON.

Witnesses:
  W. V. PINKSLOW,
  GUS S. LUCKETT.